United States Patent [19]
Lundie et al.

[11] Patent Number: 4,600,122
[45] Date of Patent: Jul. 15, 1986

[54] SEED METER DISK FOR USE WITH SUNFLOWER AND OTHER SEEDS OF LONG, SLENDER SHAPE

[75] Inventors: William R. Lundie, East Moline; Jay H. Olson, Rock Island, both of Ill.

[73] Assignee: Deere & Company, Moline, Ill.

[21] Appl. No.: 592,898

[22] Filed: Mar. 23, 1984

[51] Int. Cl.⁴ .............................................. B65G 29/00
[52] U.S. Cl. ..................................... 221/211; 221/266
[58] Field of Search ............. 221/211, 266, 278, 254, 221/203; 111/77, 34; 209/684

[56] References Cited

U.S. PATENT DOCUMENTS

| | | | |
|---|---|---|---|
| 3,608,787 | 9/1971 | Grataloup | 222/342 |
| 3,888,387 | 6/1975 | Deckler | 221/278 |
| 4,047,638 | 9/1977 | Harrer | 221/266 |
| 4,074,830 | 2/1978 | Adams | 221/266 |

FOREIGN PATENT DOCUMENTS 216872 8/1924 United Kingdom ................ 209/684

*Primary Examiner*—Stanley H. Tollberg
*Attorney, Agent, or Firm*—Fraser and Bogucki

[57] ABSTRACT

In a seed meter in which a pressure differential is utilized in conjunction with a rotating seed disk having a circumferential row of seed cells therein to pick up individual seeds from a seed mass and deliver the seeds to a seed discharge area, the seed cells are uniquely configured for use with seeds such as sunflower seeds which are of relatively long and slender configuration and of relatively low mass. Each seed cell includes a teardrop shaped recess in the side surface of the disk having an aperture extending through the disk from the bottom thereof to communicate the pressure differential to a seed held within the recess. The seed cell includes a projection extending outwardly from the side surface of the disk and having a surface generally continuous with the back wall of the seed cell so as to aid in picking up and retaining a seed within the recess in addition to providing agitation of the seed mass prior to pickup of the seed. The projection has a sloping top surface to facilitate removal of excess seeds, a beveled outer edge to avoid pressing a seed against the inner wall of the seed meter housing and a sharp inner front edge to prevent excess seeds from lodging between the projection and a fin disposed adjacent and radially inwardly from the recess of the seed cell.

12 Claims, 11 Drawing Figures

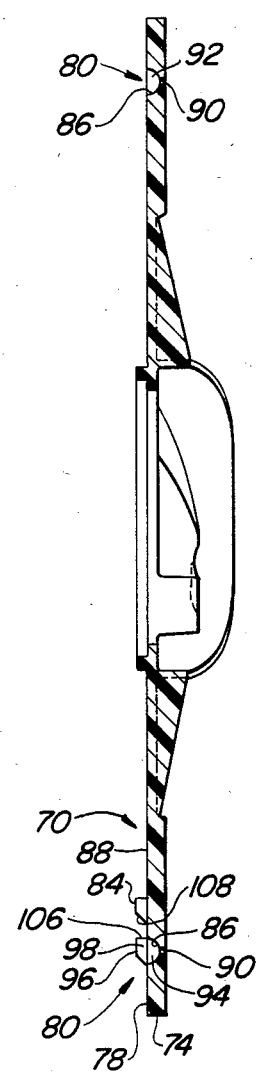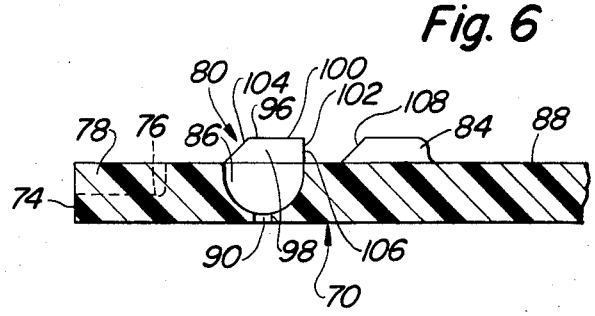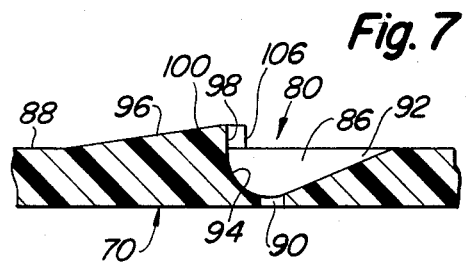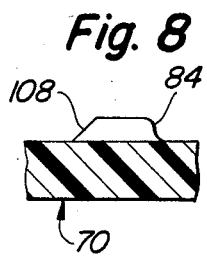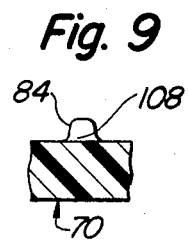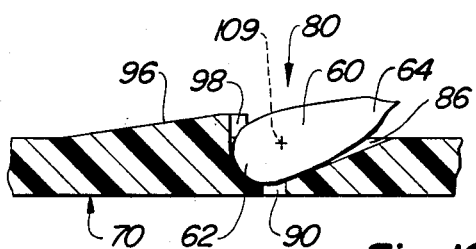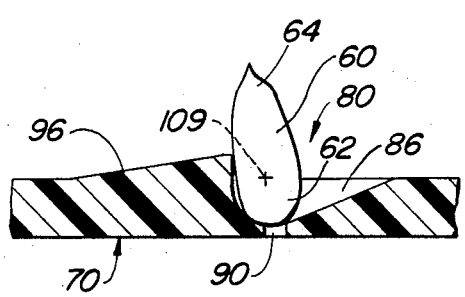

SEED METER DISK FOR USE WITH SUNFLOWER AND OTHER SEEDS OF LONG, SLENDER SHAPE

BACKGROUND OF THE INVENTION

1. Field of the Invention

The present invention relates to seed meters for metering individual seeds at a controlled rate into a seed furrow, and more particularly to a seed meter seed disk which can be advantageously used with sunflower seeds and other seeds of long, slender shape and low mass.

2. History of the Prior Art

Seed meters of various designs have been employed to dispense seeds at a controlled rate into a seed furrow as the seed meter is advanced along the furrow. In a typical arrangement a tractor is coupled to tow a tool bar to which are attached in generally parallel, spaced-apart relation a plurality of planting units with seed meter arrangements attached thereto. Each of the planting units includes a seed hopper for containing a quantity of the seed to be planted, a device for opening a furrow as the tractor drawn tool bar is advanced over the ground, a seed meter coupled to the seed hopper for metering or dispensing individual seeds into the furrow at a controlled rate and a further device for moving soil at the sides of the furrow to close the furrow over the seeds. The planting unit may further include containers for insecticide and herbicide together with apparatus for dispensing controlled amounts of each.

Many seed meters are of the air type which use an air pressure differential to pick up and then discharge individual seeds from a seed mass in controlled fashion. Typically, a rotating seed disk having one or more circumferential rows of apertures therein is used to pick up and then discharge the individual seeds.

Air seed meters may be of the positive pressure type in which air is blown into a seed chamber and onto the surface of the rotating seed disk or other movable member to create a higher than atmospheric pressure in the chamber. This forces seeds from a seed mass onto the seed disk where they are retained in the apertures for later release. The seeds are held against the apertures by blowing air until they are released by interrupting the flow of air to the seeds. Examples of such air seed meters are provided by U.S. Pat. Nos. 3,888,387 of Deckler, 4,047,638 of Harrer and 4,074,830 of Adams.

Air seed meters may also be of the vacuum type in which a vacuum source is typically coupled to a separate chamber on the opposite side of the seed disk from the seed mass. The vacuum communicates through apertures in the seed disk to the seed mass to hold the seeds in place against the apertures as they are picked up from the seed mass and moved to the seed discharge area. An example of a vacuum seed meter is provided by U.S. Pat. No. 3,608,787 of Grataloup.

A further example of a vacuum seed meter which has particular advantages over seed meters of the prior art is provided by a co-pending application of William R. Lundie et al, Ser. No. 546,834, filed Oct. 31, 1983 and commonly assigned with the present application. The Lundie et al application describes a vacuum seed meter in which a seed disk is rotatably mounted within a housing so as to divide the interior of the housing into a first chamber adjacent a first side of the seed disk and an opposite second chamber at the opposite or second side of the seed disk. The seed disk is provided with one or more circumferential rows of apertures which extend through the thickness of the seed disk from the second side of the disk and terminate at the bottoms of recesses in the first side of the disk which define seed cells. The seed cells act to agitate, accelerate and then capture therein individual seeds from a seed mass within the first chamber. The individual seeds are held within the seed cells by a vacuum source coupled to the second chamber as the seeds are transported from the seed mass to a separate seed discharge area within the first chamber. At the seed discharge area the vacuum source is cut off from the apertures in the seed disk, allowing the individual seeds to fall out of the seed cells and through a chute to the ground below. The vacuum seed meter is usable with various different types of seeds, simply by changing the seed disk. Different seed disks have different sized apertures and different sizes and configurations of the connecting seed cells depending on the particular seed or type of seed to be metered by the seed meter.

Seed disks of the type shown and described in the previously referred to co-pending application Ser. No. 546,834 of Lundie et al have been found to work very well with most types of seeds. The recesses in the disk surface which form the individual seed cells typically provide adequate seed agitation and acceleration within the seed mass such that an individual seed is picked up and retained within each seed cell. Separate fins can be provided on the side surface of the seed disk where necessary to provide additional seed agitation. The seed cells are sized and configured to receive and retain a single seed therein, while additional seeds are caused to fall away from the seed cell and back into the seed mass. The vacuum source communicates with the individual seed within each seed cell through the aperture at the bottom of the cell recess to assist in holding the seed in place until the seed discharge area is reached.

However, certain difficulties occur when seed disks of this type are used with sunflower seeds and other seeds having a long, slender shape and relatively low mass. Because of the relatively low mass, the aperture extending through the seed disk from the bottom of the recess must be relatively small so as to minimize the amount of force communicated to the seed cell by the vacuum source. With the larger apertures used with most seeds, the much stronger force from the vacuum source tends to hold two or more seeds within or in the region of each seed cell rather than the desired single seed, due to the relatively low mass of such seeds. The reduced force which results from a smaller aperture is adequate to hold a single sunflower seed or similar seed within a seed cell after the seed has become seated within the cell. However, due to the long, slender shape of such seeds and the considerably reduced vacuum force, it is difficult to reliably pick up such seeds in seed cells comprised only of a recess within the disk surface, even where fins are provided on the side surface of the disk to increase seed agitation. The long, slender seeds assume a variety of different positions within the recesses, from which it is very easy for the seeds to slip or tumble out of the seed cell recess in the face of the reduced force from the vacuum source provided by the smaller aperture.

Accordingly, it would be desirable to provide an improved seed disk for use with seeds such as sunflower seeds which have a relatively long, slender shape and a relatively low mass.

BRIEF SUMMARY OF THE INVENTION

Seed disks in accordance with the invention employ a projection at the back of and in conjunction with each seed cell recess to greatly aid in picking up and retaining a single seed within the recess. The projection which extends outwardly from the side surface of the seed disk has a surface generally continuous with a portion of the rear wall of the cell recess. In addition to increasing the height of the rear wall of the cell by an extent considerably greater than the maximum depth of the recess, the surface of the projection extends around at least a substantial portion of the rear wall of the recess. These features greatly aid in picking up and retaining a single sunflower or similar seed within the seed cell.

Each projection is preferably provided with a top surface which slopes gradually downwardly from a maximum height at the rear wall of the cell to the side surface of the disk. The resulting ramp-like top surface of the projection facilitates removal of excess seeds which may slide over the top of the projection from the rear wall of the cell. The projection has an outer edge extending along the length thereof from the rear wall of the seed cell adjacent the top surface. This outer edge is preferably beveled to prevent seeds from becoming wedged and possibly crushed between the projection and the adjacent inner wall of the seed meter housing. The projection also preferably has an inner front edge adjacent the rear wall of the seed cell. The inner front edge is preferably relatively sharp so as to facilitate the passage of excess seeds therearound.

The projections associated with the various seed cells in accordance with the invention have been found to provide increased seed agitation within the seed mass in addition to facilitating pickup and retention of seeds within the recesses. However, to provide additional agitation a plurality of fins may be provided on the side surface of the seed disk. The fins are provided on the side surface of the disk in a circular array just inside of and generally concentric with the circular array defined by the circumferential row of seed cells. Each fin is disposed inwardly from and adjacent the recess of a different seed cell. The fin is spaced from the projection of the seed cell by a distance sufficient to discourage or prevent seeds from becoming lodged therebetween. Each fin which is of relatively thin, flat configuration has an outer edge adjacent the seed cell recess which is preferably beveled to discourage seeds from lodging or residing thereon.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 5 is a sectional view of the seed disk of FIG. 4 taken along the line 5—5 thereof;

FIG. 6 is a sectional view of a portion of the seed disk of FIG. 4 taken along the line 6—6 thereof and showing the details of a seed cell and adjacent fin;

FIG. 7 is a sectional view of a portion of the seed disk of FIG. 4 taken along the line 7—7 thereof and showing the details of the seed cell shown in FIG. 6;

FIG. 8 is a sectional view of a portion of the seed disk of FIG. 4 taken along the line 8—8 thereof and illustrating the details of the fin shown in FIG. 6;

FIG. 9 is a sectional view of a portion of the seed disk of FIG. 4 taken along the line 9—9 thereof and showing further details of the fin shown in FIG. 6;

FIG. 10 is a sectional view similar to FIG. 7 and showing the sunflower seed of FIG. 3 disposed therein in a first position; and FIG. 11 is a sectional view similar to FIG. 7 and showing the sunflower seed of FIG. 3 disposed therein in a different second position.

DETAILED DESCRIPTION

Figure 1:
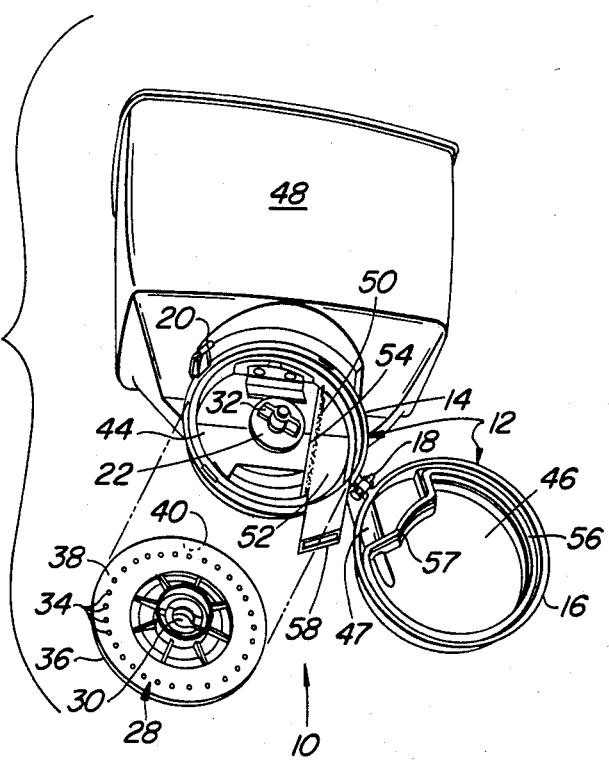
FIG. 1 is a perspective view of a seed meter with which a seed disk in accordance with the invention may be used, the seed meter being mounted on a seed hopper and being shown in an open position together with a seed disk.

FIG. 1 illustrated a vacuum seed meter 10 which is shown and described in greater detail in the previously referred co-pending application Ser. No. 546,834 of Lundie et al. The vacuum seed meter 10 has a generally cylindrical housing 12 comprised of a first half shell 14 and an opposite, mating second half shell 16. The second half shell 16 is coupled to the first half shell 14 by a hinge 18 permitting the second half shell 16 to be closed over the first half shell 14 to close the housing 12. A clasp 20 mounted on the first half shell 14 on a side thereof opposite the hinge 18 is secured to the second half shell 16 to hold the housing 12 in the closed position.

A hub 22 is rotatably mounted within the first half shell 14 of the housing 12 at the center of the first half shell 14. The hub 22 is coupled to a pair of lugs (not shown) at the outside of the seed meter 10 which are engaged to rotatably drive the hub 22. The seed meter 10 includes a seed disk 28 which has an elongated aperture 30 at the center thereof. The disk 28 is mounted for rotation on the hub 22 by passing a handle 32 which is mounted on the hub 22 through the elongated aperture 30 to seat the seed disk 28 on the hub 22. The handle 32 is then rotated into a position to lock the seed disk 28 on the hub 22.

Figure 2:
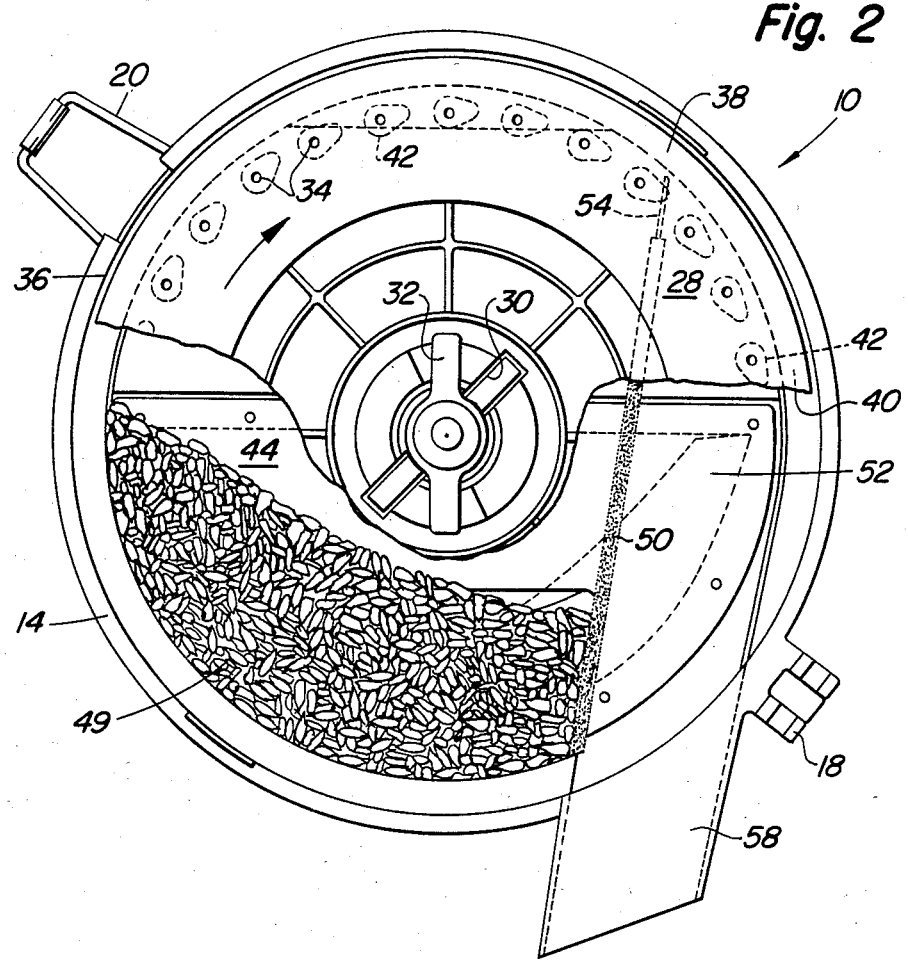
FIG. 2 is a front view, partially broken away, of a portion of the seed meter of FIG. 1 illustrating the manner in which seed cells within the seed disk pick up and transport individual seeds from a seed mass.

The seed disk 28 has a plurality of apertures 34 therein arranged in a circumferential row adjacent and inside of a circular outer edge 36 of the seed disk 28. Each of the apertures 34 extends through the thickness of the seed disk 28 between a second side 38 of the seed disk 28 and an opposite first side 40 of the seed disk 28. As shown in FIG. 2 in dotted outline, the seed disk 28 has a recess in the first side 40 thereof at each aperture 34 which forms a seed cell 42.

With the seed disk 28 mounted on the hub 22 and the second half shell 16 closed over the first half shell 14, the seed disk 28 divides the hollow interior of the cylindrical housing 12 into a first or seed chamber 44 between the seed disk 28 and the first half shell 14 and a second or vacuum chamber 46 between the seed disk 28 and the second half shell 16. A vacuum source is coupled via a vacuum port 47 in the second half shell 16 to create a vacuum within the vacuum chamber 46 adjacent the second side 38 of the seed disk 28. The vacuum communicates with the first side 40 of the seed disk 28 via the apertures 34.

As shown in FIG. 1 the first half shell 14 of the cylindrical housing 12 is mounted at the base of a seed hopper 48 for containing seeds to be metered by the vacuum seed meter 10. Seeds from the seed hopper 48 flow into the seed chamber 44 within the first half shell 14 where they form a seed mass 49 against the first side 40 of the seed disk 28, the seed mass 49 being shown in FIG. 2. As the hub 22 is rotatably driven so as to rotate the seed disk 28, the seed cells 42 formed at the ends of the apertures 34 on the first side 40 of the seed disk 28 agitate, accelerate and then capture individual seeds therein as they move through the seed mass within the seed chamber 44. As each seed cell 42 rises out of the seed mass, the seed contained therein is held in place by the vacuum within the vacuum chamber 46 which communicates with the seed via the aperture 34. The vacuum holds the seed in place in the seed cell 42 until the seed cell 42 passes across a divider brush 50. The divider brush 50 extends across the interior of the first half shell 14 and defines a seed discharge area 52 which is separated from the seed chamber 44 and the seed mass 49 contained therein by the divider brush 50 and a divider wall 54 on which the brush 50 is mounted. As each aperture 34 enters the seed discharge area 52, the effects of the vacuum thereon from within the vacuum chamber 46 are cut off. This is due to the shape of a vacuum seal 56 which is mounted on the inside of the second half shell 16 and which extends into contact with the second side 38 of the seed disk 28. A portion 57 of the vacuum seal 56 extends inwardly from the region adjacent the circumference of the second half shell 16 to isolate the opposite seed discharge area 52 from the vacuum. As the vacuum is cut off from each aperture 34, the individual seed contained within the adjoining seed cell 42 falls out of the seed cell 42 under the influence of gravity. The seed falls through a seed discharge chute 58 at the bottom of the first half shell 14 to the ground below.

The seed disk 28 described in connection with FIGS. 1 and 2 works well for most type of seeds. The recesses defining the seed cells 42 provide adequate seed agitation and acceleration within the seed mass 49 in most instances, and the shape of the cell 42 combined with the force of the vacuum communicated thereto via the apertures 42 provide for the pickup and retention of a single seed within each of the cells 42 for transport between the seed mass 49 and the seed discharge area 52. Fins (not shown) can be provided on the first side 40 of the seed disk 28 adjacent the cells 42 to provide additional agitation within the seed mass 49 where desired.

Figure 3:
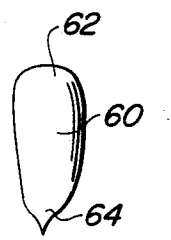
FIG. 3 depicts a typical sunflower seed which is of long, slender shape.

The seed disk 28 has been successfully used with seeds such as corn, cotton, sorghum, sugar beets and soy beans. However, certain seeds such as sunflower pose certain problems with respect to the seed disk 28. This is due to the long and slender shape of sunflower seeds, particularly when this fact is combined with the relatively low mass thereof. FIG. 3 depicts a typical sunflower seed 60. It will be seen that the seed 60 is of generally long, slender configuration between opposite ends 62 and 64 thereof. The end 62 is typically slightly larger than the opposite end 64 which is somewhat pointed, but in any event the ends 62 and 64 are both considerably smaller than the opposite sides of the seeds 60 therebetween. The sunflower seed 60 has a low density composition and therefore tends to have a relatively low mass for its size when compared with other types of seeds.

Because of the relatively low mass of the sunflower seed 60, the seed disk 28 when designed for use therewith must be provided with relatively small apertures 34 in order to reduce the vacuum force at the seed cells 42. Otherwise, the force of the vacuum would cause two or more of the low mass seeds 60 to attach to each seed cell 42 within the seed mass 49, and this is highly undesirable. Typical standards of seed meter performance allow for very few of such unwanted doubles. Conversely, such standards of performance are rather intolerant of skipped seeds or voids. It is therefore imperative that each seed cell 42 carry one and no more than one seed from the seed mass 49 to the seed discharge area 52.

Because of the reduced amount of force from the vacuum source at the seed cell 42 in the case of the sunflower seeds 60 required to prevent seed doubling, the task of picking up individual seeds within the seed cells 42 as the cells 42 move through the seed mass 49 is greatly increased. This problem is even further complicated by the long, slender shape of the sunflower seeds 60. Whereas seeds of more rounded configuration are more easily picked up and retained within the cells 42, the long, slender shape of the sunflower seeds 60 results in some difficulty in positioning such seeds for retention within the seed cell 42. The seeds 60 tend not to fall within the seed cell 42 in the absence of considerable seed agitation and acceleration within the seed mass 49. Those seeds that do fall within the seed cell 42 tend to fall or tumble out of the cell 42 in the face of the low amount of vacuum present.

Figure 4:
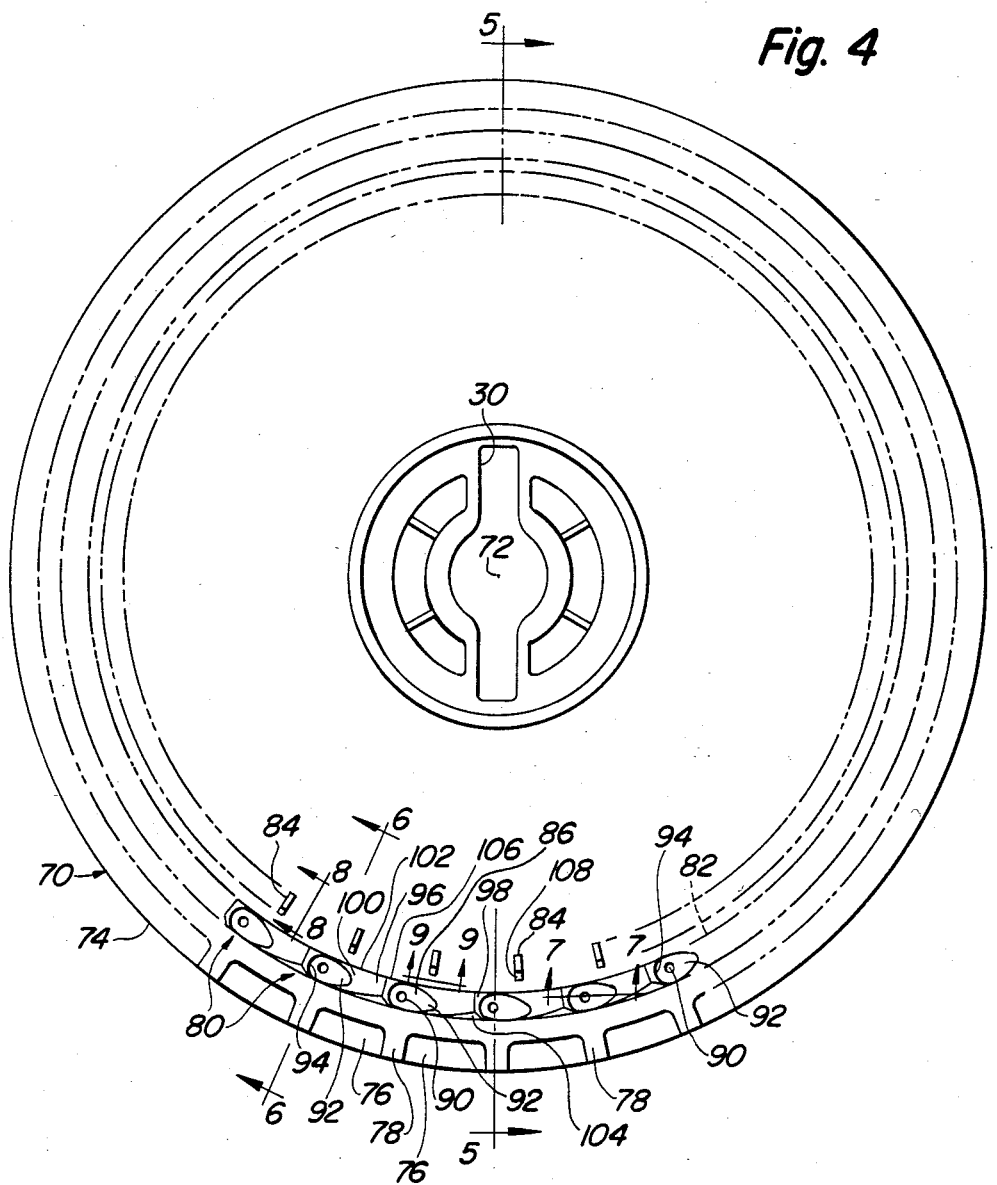
FIG. 4 is a plan view of a seed disk in accordance with the invention.

In accordance with the invention a seed disk is provided which is ideally suited for use with sunflower seeds and similar seeds having a long, slender configuration and relatively low mass. Such a seed disk 70 is shown in FIGS. 4-9. The seed disk 70 is similar to the seed disk 28 of FIGS. 1 and 2 in terms of its size and shape and the manner in which it is mounted on the hub 22 of the seed meter 10. Thus, as shown in FIG. 4 the central portion of the seed disk 70 is provided with the aperture 30 for receipt of the handle 32 shown in FIGS. 1 and 2 so that the seed disk 70 can be mounted on the hub 22 in the same manner. The seed disk 70 differs from the seed disk 28 in terms of the configuration of the seed cells and the presence and location of a plurality of fins in conjunction with such seed cells.

As shown in FIG. 4 the seed disk 70 is flat and relatively thin and of circular configuration, having a center 72 thereof at the axis of rotation for the seed disk 70. The seed disk 70 has a circular outer edge 74. An alternating succession of cavities 76 at the circular outer edge 74 define a succession of intervening radial ribs 78. The radial ribs 78 are useful in expelling broken seeds and other debris from the housing 12 of the seed meter 10.

The seed disk 70 has a circumferential row of spaced-apart seed cells 80 arranged around a circular path 82 which has its center at the center 72 of the seed disk 70. The circumferential row of seed cells 80 within the circular path 82 is disposed inwardly from but adjacent and concentric with the circular outer edge 74 of the seed disk 70. The seed disk 70 is also provided with a circumferential row of spaced-apart fins 84 disposed radially inwardly from and generally concentric with the circular path 82 of the seed cells 80. A different fin 84 is disposed adjacent each of the seed cells 80.

Each of the seed cells 80 includes a recess 86 in a side surface 88 of the seed disk 70. Each of the recesses 86 is of generally oblong configuration, and in the present example intersects the side surface 88 of the seed disk 70 so as to provide the recess 86 with a generally teardrop shape or outline. A different aperture 90 extends through the thickness of the seed disk 70 from the bottom of each recess 86 to allow the vacuum within the vacuum chamber 46 to communicate with the recesses 86. The apertures 90 are typically smaller than the apertures 34 in the seed disk 28 of FIGS. 1 and 2 to provide a reduced amount of force from the vacuum source within the recesses 86. This is necessary to provide unwanted doubling of the seeds 60 within the recesses 86 in view of the relatively low mass of the seeds 60.

As shown in FIG. 6 each of the recesses 86 has a generally uniform cross-sectional shape in a radial direction relative to the center 72 of the seed disk 70. However, and as shown in FIG. 7, each of the recesses 86 has an asymmetrical cross-sectional shape in a circumferential direction along the circular path 82 of the seed cells 80. This provides each of the recesses 86 with a relatively gradually sloping front wall 92 on one side of the aperture 90 and a relatively steeply sloped rear-wall 94 on the other side of the aperture 90. Accordingly, the aperture 90 is located considerably closer to the intersection of the rear wall 94 with the side surface 88 of the seed disk 70 than to the intersection of the front wall 92 with the side surface 88 of the seed disk 70.

Each of the seed cells 80 includes a projection 96 which extends outwardly from the side surface 88 of the seed disk 70 adjacent the recess 86 of the seed cell 80. The projection 96 which is disposed within the circular path 82 between the recess 86 of the seed cell 80 and an adjacent seed cell has a surface 98 which is generally continuous with a substantial portion of the rear wall 94 of the recess 86.

In addition to the surface 98, the projection 96 has a top surface 100. The top surface 100 intersects with the surface 98 of the projection 96 at a point of maximum height of the projection 96 above the side surface 88 of the seed disk 70 at the rear wall 94 of the recess 86. The top surface 100 slopes gradually downwardly along the circular path 82 to a point where it converges into the side surface 88 of the seed disk 70. Accordingly, the top surface 100 provides the projection 96 with a ramp-like configuration.

The projection 96 has an inner edge 102 extending along a portion of the circular path 82 at one side of the top surface 100, and an opposite outer edge 104 which extends along a portion of the circular path 82. The outer edge 104 is located at a greater radial distance from the center 72 than the inner edge 102. The outer edge 104 is beveled along the length thereof so that it does not intersect the top surface 100 at a right angle.

The surface 98 of the projection 96 terminates on the inner side of the projection 96 at an inner front edge 106. The inner front edge 106 comprises a relatively sharp edge.

The projection 96 of each of the seed cells 80 combines with the adjacent recess 86 and the aperture 90 to pick up and retain therein a single sunflower or similar seed 60. The surface 98 of the projection 96 which substantially increases the height of the rear wall 94 of the recess 86 prevents the long, slender sunflower seed 60 from sliding or tumbling out of the recess 86 as the seed is scooped up and carried out of the seed mass 49. As previously noted, the surface 98 of the projection 96 is curved and extends around a substantial portion of the rear wall 94 of the recess 86. This insures retention of the seed 60 within the seed cell 80 in the face of changing orientations of the seed cell 80 relative to gravity as the seed cell 80 moves upwardly from the seed mass 49 to the top of the path of rotation of the seed disk 70 and then down into the seed discharge area 52. As the seed cell 80 moves within the seed mass 49, it frequently happens that two or more of the seeds 60 are scooped up by the recess 86 and the adjacent surface 98 of the projection 96. The recess 86 is somewhat but not substantially larger than one of the seeds 60, encouraging retention of a single seed 60 therein to the exclusion of the other seeds. Moreover, and as just described, the surface 98 of the projection 96 prevents the singled seed within the recess 86 from sliding or tumbling out of the recess 86. At the same time additional seeds fall away from the seed cell 80 as the seed cell 80 rises above the seed mass 49. The sloped top surface 100 of the projection 96 aids in the removal of such extra seeds. As such extra seeds slide along or land on the top surface 100, the ramp-like slope of the top surface 100 causes such seeds to easily slide away and back into the seed mass 49. There are no sharp edges or other portions associated with the top surface 100 which might tend to catch the extra seeds and prevent them from falling back into the seed mass 49.

As previously noted the outer edge 104 of the projection 96 is beveled. While not shown, the inner wall of the first half shell 14 of the housing 12 is disposed relatively close to the circular outer edge 74 of the seed disk 70, and for that matter the outer edge of the seed disk 28 of FIGS. 1 and 2, in the vicinity of the circular outer periphery of the housing 12. The beveled outer edge 104 of the projection 96 tends to prevent seeds from falling between the projection 96 and the inner wall of the first half shell 14, thereby preventing such seeds from being crushed or otherwise interfering with the operation of the seed meter 10.

The fins 84 are shown in FIGS. 8 and 9 in addition to FIGS. 4 and 5. As previously noted each of the fins 84 is of thin, flat configuration and has an outer edge 108 thereof disposed adjacent the recess 86 and the projection 96. The fins 84 are not an essential part of the seed cells 80 but are present where desired to provide additional agitation and acceleration of seeds within the seed mass 49 in addition to that provided by the projections 96.

It will be noted from FIG. 4 that each fin 84 is positioned well forward of the projection 96 and the central portion of the recess 86 which includes the aperture 90. The fin 84 is desirably located a sufficient distance from the projection 96 to discourage or prevent the seeds 60 from lodging or wedging therebetween. The relatively sharp inner front edge 106 of the projection 96 acts to prevent the seeds from tending to wedge between the edge 106 and the fin 84, in addition to facilitating the passage of excess seeds around the edge 106. The beveling of the outer edge 108 of the fin 84 tends to prevent the seeds 60 from lodging between the fin 84 and the projection 96 or from hanging up on the fin 84.

As previously noted the recess 86 is oblong in shape and in the present example has a generally teardrop shaped outline where it intersects with the side surface 88 of the seed disk 70. The oblong shape of the recess 86 provides the recess 86 with an axis of elongation which extends generally in the direction of the circular path 82. However, the axis of elongation of the recess 86 is not tangent to the circular path 82 but rather is angled out by 6°–12° from a line tangent to the circular path 82. This discharges the seed from the recess 86 in a manner which directs the seed down the discharge chute 58 in the correct direction to improve spacing accuracy of the seeds. It also directs the seed away from the greater part of the projection 96.

As previously noted the recess 86 is larger but not substantially larger than the sunflower seed 60 so as to retain a sinle seed 60 within the recess 86 to the exclusion of other seeds. The diameter of the recess 86 must be slightly larger than the width of the sunflower seed 60. The depth of the recess 86 is preferably equal to or greater than the diameter of the spheroidal section of the recess 86. This helps to retain a single seed therein to the exclusion of other seeds and at the same time to provide extra support to the single seed to assure that it is not dropped prematurely.

These features are better illustrated with reference to FIG. 10 which is a view similar to FIG. 7 but with the sunflower seed 60 residing within the recess 86. It will be seen that the seed cell 80 is large enough to retain the single seed 60 therein without substantial danger of losing the seed 60 prematurely. At the same time the seed cell 80 is not so large as to accommodate additional seeds thereat in addition to the single seed 60. Such additional seeds slide or tumble away from the seed cell 80 as the seed cell 80 rises out of the seed mass 49.

It has been found that the long, slender sunflower seeds 60 tend to position themselves an upright manner in the seed cells 80. This is illustrated in FIG. 11 where the sunflower seed 60 is shown residing on its end 62 within the seed cell 80. Of course, the seed 60 could just as easily reside on its opposite end 64 in the seed cell 80. With the projection 96 being present at the rear wall 94 of the recess 86, the surface 98 of the projection 96 supports the seed 60. Without the presence of the projection 96, the center of gravity 109 of the seed 60 would be outside of the seed cell 80 and the seed 60 would fall from the seed cell 80.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A seed disk of relatively thin and flat configuration having a plurality of spaced-apart recesses in a side surface of the disk arranged in a circular path around the disk, a plurality of apertures in the disk, each of the apertures extending through the disk from a different one of the recesses, and a plurality of projections in the side surface of the disk along the circular path, each of the projections extending outwardly from the side surface at an edge of a different one of the recesses, each of the recesses having a rear wall thereof located in the circular path and each of the projections having a surface thereof forming a continuation of a portion of the rear wall of a different one of the recesses, the circular path having a center at an axis of rotation of the disk, the rear wall of each recess extending around one of the apertures which extends through the disk from the recess from an outer location on the opposite side of the aperture from the center of the circular path to an inner location on the same side of the aperture as the center of the circular path, and the surface of one of the projections forming a continuation of a portion of the rear wall being curved and extending around the aperture along a substantial portion of the rear wall.

2. A seed disk of relatively thin and flat configuration having a plurality of spaced-apart recesses in a side surface of the disk arranged in a circular path around the disk, a plurality of apertures in the disk, each of the apertures extending through the disk from a different one of the recesses, a plurality of projections in the side surface of the disk along the circular path, each of the projections extending outwardly from the side surface at an edge of a different one of the recesses, and a plurality of fins arranged in a second circular path inside of and generally concentric with the first-mentioned circular path, each of the fins extending outwardly from the side surface of the disk adjacent a different one of the plurality of recesses.

3. The invention set forth in claim 2, wherein each of the fins has an outer edge thereof adjacent one of the plurality of recesses, the outer edge being beveled.

4. A seed disk of circular configuration, the seed disk being adapted to be mounted in a seed meter for rotation about the center of the disk, the disk having a circumferential row of seed cells therein disposed adjacent an outer circular edge of the disk, each of the seed cells comprising a recess in a side surface of the disk, the recess being generally oblong in shape and having an aperture extending through the disk from a bottom thereof, and a projection extending outwardly from the side surface of the disk between the recess and an adjacent recess along the circumferential row of seed cells, the projection having a surface which is generally continuous with a portion of the recess.

5. The invention set forth in claim 4, further including a circumferential row of fins disposed within and generally concentric with the circumferential row of seed cells, each of the fins extending outwardly from the side surface of the disk adjacent a different one of the seed cells.

6. The invention set forth in claim 4, wherein the recess of each seed cell has a first end thereof which extends radially outwardly from an opposite second end thereof relative to the center of the disk.

7. The invention set forth in claim 4, wherein the recess of each seed cell has a rounded end forming a back wall of the seed cell and the surface of the projection of the seed cell is generally continuous with a substantial portion of the rounded end of the recess to provide the back wall with a height substantially greater than the depth of the recess within the disk around the substantial portion of the rounded end of the recess.

8. The invention set forth in claim 5, wherein each of the fins is of generally thin and flat configuration and has an outer edge adjacent one of the seed cells, the outer edge being beveled.

9. The invention set forth in claim 8, wherein the projection of each seed cell has an inner edge adjacent one of the fins, the inner edge being relatively sharp.

10. The invention set forth in claim 6, wherein the recess of each seed cell has a generally teardrop shape at the side surface of the disk.

11. The invention set forth in claim 7, wherein the projection of each seed cell extends outwardly from the side surface of the disk to a top surface thereof, the top surface sloping gradually downwardly from the back wall of the seed cell to the side surface of the disk at an adjacent seed cell.

12. The invention set forth in claim 11, wherein the projection of each seed cell has an outer edge extending along a portion of the circumferential row of seed cells on an opposite side of the projection from the center of the disk, the outer edge being beveled.

* * * * *